(12) United States Patent
Zhang et al.

(10) Patent No.: US 12,275,432 B2
(45) Date of Patent: Apr. 15, 2025

(54) METHOD AND SYSTEM FOR CONTROLLING INTELLIGENT NETWORK VEHICLE

(71) Applicant: UISEE TECHNOLOGIES (BEIJING) LTD, Beijing (CN)

(72) Inventors: Yuxin Zhang, Beijing (CN); Jiancheng Chen, Beijing (CN)

(73) Assignee: UISEE TECHNOLOGIES (BEIJING) LTD, Beijing (CN)

( * ) Notice: Subject to any disclaimer, the term of this patent is extended or adjusted under 35 U.S.C. 154(b) by 266 days.

(21) Appl. No.: 17/785,935

(22) PCT Filed: Dec. 16, 2019

(86) PCT No.: PCT/CN2019/125779
§ 371 (c)(1),
(2) Date: Jun. 16, 2022

(87) PCT Pub. No.: WO2021/119964
PCT Pub. Date: Jun. 24, 2021

(65) Prior Publication Data
US 2023/0025222 A1     Jan. 26, 2023

(51) Int. Cl.
*B60W 60/00* (2020.01)
*B60W 30/08* (2012.01)
*B60W 50/02* (2012.01)

(52) U.S. Cl.
CPC ........ *B60W 60/0015* (2020.02); *B60W 30/08* (2013.01); *B60W 50/0205* (2013.01); *B60W 60/0013* (2020.02); *B60W 2556/45* (2020.02)

(58) Field of Classification Search
CPC ............. B60W 60/0015; B60W 30/08; B60W 50/0205; B60W 60/0013; B60W 2556/45;
(Continued)

(56) References Cited

U.S. PATENT DOCUMENTS 10,394,243 B1 * 8/2019 Ramezani ............. B60W 30/10
11,537,134 B1 * 12/2022 Wiest ................... G06N 3/0455
(Continued)

FOREIGN PATENT DOCUMENTS

| CN | 105774803 A | * | 7/2016 |
| CN | 106143533 A |   | 11/2016 |

(Continued)

OTHER PUBLICATIONS

Machine Translation of CN105774803 (Year: 2016).*

*Primary Examiner* — Navid Z. Mehdizadeh
*Assistant Examiner* — Shelley Marie Osterhout
(74) *Attorney, Agent, or Firm* — Bayramoglu Law Offices LLC (57) ABSTRACT

A system for controlling an intelligent network vehicle is provided, and the system comprises a sensor group configured to obtain sensor information; a sensing and positioning module configured to obtain sensing information and positioning information based on the sensor information; a planning and control module configured to determine vehicle planning control information based on the sensing information and the positioning information; a safety control module configured to determine safety control information based on the sensing information and the positioning information; a function assessment module configured to determine a vehicle state assessment result; a risk assessment module configured to determine a risk assessment result; a logical arbitration module configured to determine vehicle execution information by arbitrating the vehicle planning control information and the safety control information; and an execution module configured to control the vehicle driving based on the vehicle execution information.

20 Claims, 2 Drawing Sheets

(58) Field of Classification Search
CPC ......... B60W 30/10; B60W 2050/0094; B60W 50/029; B60W 60/00182; B60W 60/00186; B60W 2050/0004; B60W 2050/0006; B60W 50/045; B60W 30/02; B60W 50/0097; B60W 50/0098; B60W 50/04; B60W 2050/0002; B60W 2050/0043

See application file for complete search history.

(56) References Cited

U.S. PATENT DOCUMENTS

| | | | |
|---|---|---|---|
| 11,650,585 B1* | 5/2023 | Aschbacher | G07C 5/0816 701/29.2 |
| 2011/0066344 A1 | 3/2011 | Niwa et al. | |
| 2015/0291216 A1 | 10/2015 | Sato et al. | |
| 2016/0129907 A1* | 5/2016 | Kim | G06V 20/588 701/26 |
| 2017/0248959 A1 | 8/2017 | Matsubara et al. | |
| 2019/0143992 A1 | 5/2019 | Sohn et al. | |
| 2019/0361439 A1 | 11/2019 | Zeng et al. | |
| 2019/0361454 A1 | 11/2019 | Zeng et al. | |
| 2020/0172081 A1* | 6/2020 | Sakayanagi | B60W 40/105 |
| 2020/0218259 A1* | 7/2020 | Parchami | G05D 1/0088 |
| 2020/0346643 A1* | 11/2020 | Woon | B60W 60/00276 |

FOREIGN PATENT DOCUMENTS

| | | |
|---|---|---|
| CN | 107972663 A | 5/2018 |
| CN | 108428357 A | 8/2018 |
| CN | 109969192 A | 7/2019 |
| JP | 2016013751 A | 1/2016 |
| JP | 2017154554 A | 9/2017 |
| JP | 2019191839 A | 10/2019 |
| KR | 20190061693 A | 6/2019 |
| KR | 20190091419 A | 8/2019 |
| WO | 2017154152 A1 | 9/2017 |

* cited by examiner

METHOD AND SYSTEM FOR CONTROLLING INTELLIGENT NETWORK VEHICLE

CROSS REFERENCES TO THE RELATED APPLICATIONS

This application is the national phase entry of International Application No. PCT/CN2019/125779, filed on Dec. 16, 2019, the entire contents of which are incorporated herein by reference.

TECHNICAL FIELD

This disclosure relates to the field of intelligent vehicle, and more particularly to a method and system for control intelligent network vehicle.

BACKGROUND

With the continuous development of intelligent network vehicle technology, intelligent network vehicle has gradually changed from agent assisted driving to agent independent driving. Moreover, in the process of continuous intelligence, intelligent network vehicles have many differences with traditional vehicles. For example, the high-level intelligent network vehicle has been completely separated from the driver's control, and its failure needs to be independently judged and degraded. It cannot be ignored that there is a great difference between the driving style of intelligent network vehicles and human drivers. And a high degree of intelligence is accompanied by a high driving risk. Therefore, the safety of the high-level intelligent network vehicle becomes the key to its implementation.

Most control system of the intelligent network vehicle is still based on traditional control system. Considering that the control system architecture is too simple, and that the redundant control is too rigid, drivers' or inspectors' auxiliary control or even direct control is needed. This leads to the intelligent agent cannot behave well in the process of decision-making, supervision, fault diagnosis, and avoid the risk of driving.

Therefore, the current control system architecture cannot meet the requirements of independent driving of intelligent network vehicles. It has become a key and urgent technical problem to develop a reliable control system architecture according to the driving characteristics and driving conditions of intelligent network vehicles has become a key technical problem to be solved urgently.

SUMMARY

The present disclosure provides a control system and control method for an intelligent network vehicle to solve the problem of failing to meet the safety requirements of intelligent network vehicles due to simple control system architecture and overly rigid redundancy control in the related art.

A first aspect of the present disclosure provides a control system for the intelligent network vehicle, the control system comprises:

the sensor group is configured to obtain sensor information;

sensing and positioning module is configured to obtain the sensing information and positioning information based on the sensor information;

planning and control module is configured to determine the vehicle planning control information based on the sensing information, the positioning information, vehicle state assessment result and risk assessment result, wherein the vehicle state assessment result is generated by function assessment module, and the risk assessment result is generated by risk assessment module;

safety control module is configured to determine the vehicle safety control information based on the sensing information, the positioning information, the vehicle state assessment result and the risk assessment result;

the function assessment module is configured to determine the vehicle state assessment result based on working status of the sensor group, the sensing and positioning module, the planning and control module, the safety control module, the function assessment module and the execution module;

the risk assessment module is configured to determine the risk assessment result based on the sensing information, the positioning information, the vehicle planning control information and state information of the planning and control module, and the vehicle safety control information and state information of the safety control module;

logic arbitration module is configured to arbitrate the vehicle planning control information and the vehicle safety control information based on working status of the function assessment module and working status of the risk assessment module to determine the vehicle execution information;

execution module is configured to control the vehicle driving based on the vehicle execution information.

A second aspect of the present disclosure provides a control method for the intelligent network vehicle, the control method being control method based on the control system described in the embodiments of the present disclosure, comprising:

obtaining sensor information;

determining sensing information and positioning information based on the sensor information;

determining the vehicle planning control information based on the sensing information, the positioning information, vehicle state assessment result and risk assessment result;

determining the vehicle safety control information based on the sensing information, the positioning information, the vehicle state assessment result and the risk assessment result;

determining the vehicle state assessment result based on vehicle state information;

determining the risk assessment result based on the sensing information, the positioning information, the vehicle planning control information and the vehicle safety control information;

determining vehicle execution information by arbitrating based on the risk assessment result, the vehicle state assessment result, the vehicle planning control information and the vehicle safety control information;

controlling the vehicle driving based on the vehicle execution information.

A third aspect of the present disclosure provides a vehicle mounted device, comprises a processor, a memory and a communication interface, the communication interface is configured to connect the processor and the memory; the processor is configured to perform the steps of the control method in the embodiments by calling a program or instruction stored in the memory.

A fourth aspect of the present disclosure provides a non-transitory computer readable storage medium, wherein the non-transitory computer readable storage medium stores program or instructions, the program or instructions causing the computer to perform the steps of the control method in the embodiments.

The present disclosure provides a control system for intelligent network vehicle: the planning and control module is configured to determine the vehicle planning control based on the sensing information and the positioning information; the safety control module is configured to determine the vehicle safety control information based on the sensing information and the positioning information; the function assessment module is configured to determine the vehicle state assessment results; the risk assessment module is configured to determine the risk assessment results; the logic arbitration module arbitrates the vehicle planning control information and vehicle safety control information based on the working status of the function assessment module and the risk evaluation module, and determines the vehicle execution information to make the vehicle execution information more accurate, so as to reduce the driving risk of intelligent network vehicles.

BRIEF DESCRIPTION OF DRAWINGS

The accompanying drawings are intended to provide a further understanding of the present disclosure and form part of the specification and, together with the specific embodiments below, are used to explain the disclosure but do not constitute a limitation of the disclosure.

DETAILED DESCRIPTION OF THE EMBODIMENTS

The following is a detailed description of the specific implementation of the disclosure in combination with the attached pictures. It should be understood that the embodiments described herein are intended only to illustrate and explain the disclosure and are not intended to limit the disclosure.

In response to the problem that the safety architecture of the intelligent network vehicle still follows a safety architecture of conventional vehicles so that the safety of the intelligent network vehicle is poor, the present disclosure provides a method and system for control the intelligent network vehicle. The control instruction of the vehicle is determined based on the state assessment result, a risk assessment result, planning and control information of the vehicle and safety control information of the vehicle for improving the accuracy of the control instruction of the vehicle, and improve the safety of the intelligent network vehicle.

Figure 1:
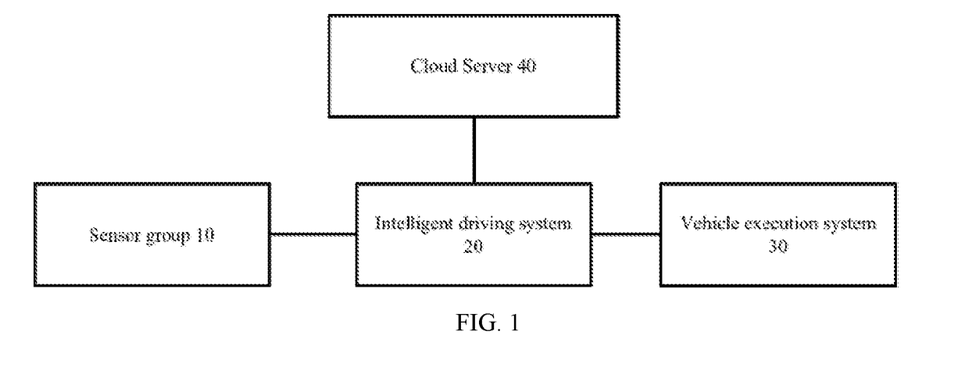
FIG. 1 is the overall architecture diagram of an intelligent networked vehicle according to some embodiments of the present disclosure.

FIG. 1 is the overall architecture diagram of an intelligent networked vehicle according to some embodiments of the present disclosure. As shown in FIG. 1, the intelligent network vehicle includes a sensor group 10, an intelligent driving system 20, a vehicle execution system 30 and a cloud server 40. Intelligent driving system 20 may be configured to communicate with cloud server 40.

The sensor group 10 is configured to obtain sensor information. The sensor group includes but is not limited to at least one of camera, Lidar, millimeter-wave radar, Global Positioning System (GPS), pressure sensor, IMU, Angle sensor, and/or speed sensor.

The intelligent driving system is configured to receive the sensor information of the sensor group and generate execution information based on the sensor information.

The vehicle execution system is configured to receive the execution information and control the vehicle based on the execution information. In some embodiments, the vehicle execution system may include, but not limited to, a steering system, a braking system, and a drive system. The steering system, the braking system and the drive system may be mature systems in vehicle field, which will not be mentioned again here.

The cloud server may communicate with the intelligent driving system for coordinating and managing intelligent network vehicles. In some embodiments, the cloud server can be configured to interact with one or more intelligent network vehicles, and coordinate and manage the scheduling of multiple intelligent network vehicles, etc. In some embodiments, the vehicle control system 20 may communicate wirelessly with the cloud server through wireless communication networks (including but not limited to GPRS network, Zigbee network, WiFi network, 3G network, 4G network, 5G network and other wireless communication networks).

In some embodiments, the cloud server may be a cloud server established by a vehicle service provider to provide cloud storage and cloud computing functions. In some embodiments, vehicle-side archives may be established in the cloud server. In some embodiments, the vehicle-end file may store various information uploaded by the vehicle control system 20. In some embodiments, the cloud server can synchronize driving data generated at the vehicle-end in real time.

In some embodiments, the cloud server may include a data warehouse and a data processing platform, wherein the data warehouse is configured to store the vehicle-side files created by the cloud server. In some embodiments, the data warehouse can uniformly collect data from various source business systems into the data warehouse and process it on the data processing platform for vehicle-ends.

In some embodiments, the cloud server may be a server or a server group of. The server group may be centralized or distributed. Distributed server is beneficial to task allocation and optimization in multiple distributed servers, and overcome the defects of traditional centralized server resource shortage and response bottleneck. In some embodiments, the cloud server may be local or remote.

In some embodiments, the cloud server can be configured to obtain information from the RSU (Road Side Unit) and the intelligent network vehicle, and send information to the intelligent network vehicle. In some embodiments, the cloud server can send the detection information corresponding to the intelligent network vehicle from the RSU to the intelligent network vehicle based the information of the intelligent network vehicle.

In some embodiments, the intelligent network vehicle may include a vehicle CAN bus, wherein the vehicle CAN bus may connect the vehicle control system 20 and the vehicle execution system 30. The interaction information between intelligent driving system 10 and the underlying vehicle execution system is transmitted through the vehicle CAN bus.

In some embodiments, the intelligent network vehicle can be controlled in manual driving mode by the driver, and also can be controlled in unmanned driving mode by the vehicle control system 20. In the manual driving mode, the driver can drive the vehicle by operating the control driving devices of the vehicle, such as, but not limited to, brake pedal, steering wheel and accelerator pedal. The control driving devices of the vehicle can directly operate the underlying vehicle execution system to control vehicle running.

In some embodiments, the intelligent network vehicle may also be an unmanned vehicle, and the vehicle may be controlled by the control instruction outputted by the intelligent control system 20 and executed by the vehicle execution system 30.

Figure 2:
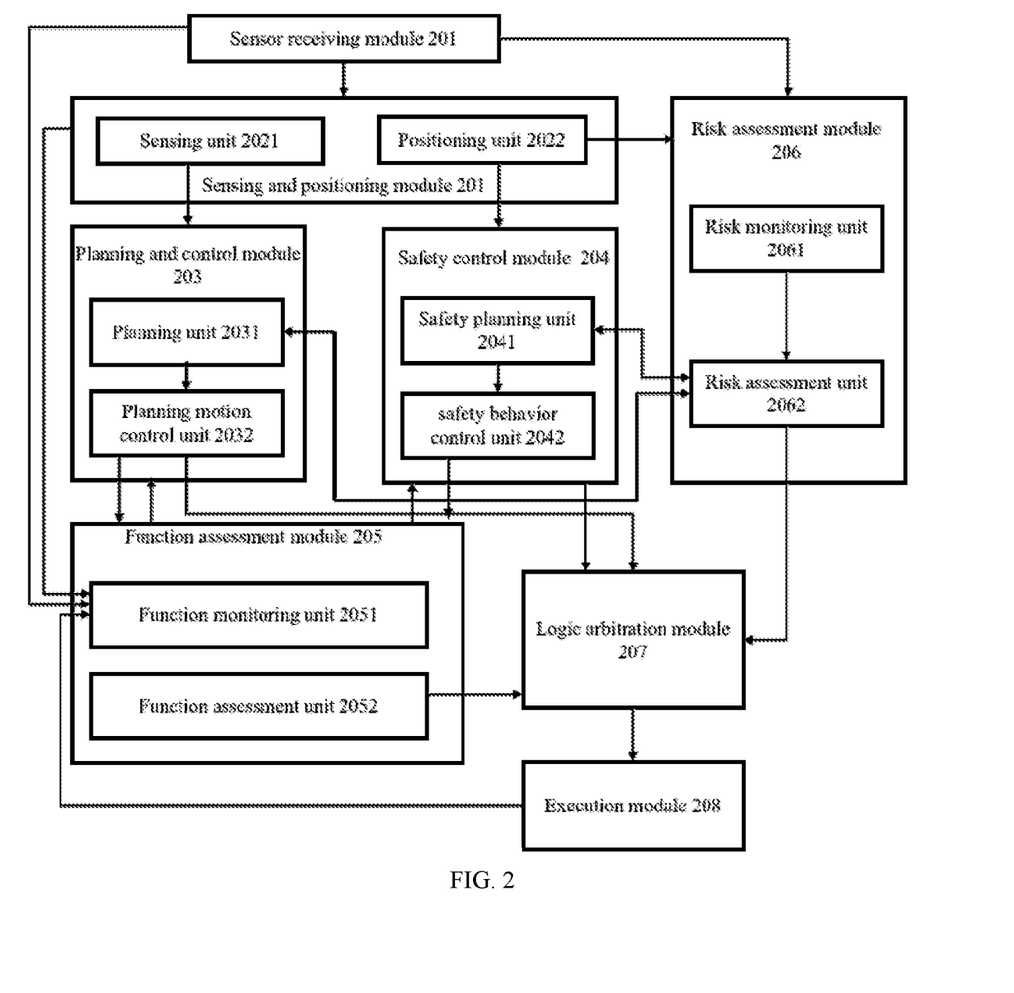
FIG. 2 is an example block diagram of a control system for an intelligent network vehicle according to an embodiment of the present disclosure.

FIG. 2 is an example block diagram of a control system for an intelligent network vehicle according to an embodiment of the present disclosure. In some embodiments, the control system can realize some functions of the intelligent control system 20 in FIG. 1 for controlling intelligent network vehicle driving.

As shown in FIG. 2, the control system for intelligent network vehicle may be divided into a sensor receiving module 201, a sensing and positioning module 202, a planning and control module 203, a safety control module 204, a function assessment module 205, a risk assessment module 206, a logic arbitration module 207, an execution module 208 and other components which can be used in the intelligent network vehicles.

The sensor receiving module 201 is configured to receive sensor information from the sensor group, and transmit the sensor information to the sensing and positioning module 202, the planning and control module 203, the safety control module 204, the function assessment module 205, and the risk assessment module 206. The sensor group may include, but not limited to, one or more of a camera, a laser radar, a millimeter wave radar, a pressure sensor, IMU, an Angle sensor, a speed sensor and the like; the sensor information may include environmental information and vehicle state information, wherein the environmental information may include obstacles, pedestrians, surrounding vehicles, feasible areas, road markings, etc. The vehicle state information may include speed, front wheel deflection angle, acceleration, deceleration, steering wheel angle, brake, throttle and other states.

In some embodiments, the sensor group can also monitor its own status information and send the own state information to the function assessment module 205 via the sensor receiving module 201. The own state information may include the working state of each sensor in the sensor group.

The sensing and positioning module 202 is configured to determine sensing information and positioning information. The sensing and positioning module 202 may further sense its own state information, and transmit the own state information to the planning and control module 203, the safety control module 204, the function assessment module 205, and the risk assessment module 206.

In some embodiments, the sensing and positioning module 202 may include sensing unit 2021 and positioning unit 2022, wherein the sensing unit 2021 may obtain the sensing information. Particularly, the sensing unit 2021 can obtain the sensing information by sensing the own state information of the vehicle and environment information outside the vehicle based on the sensor information. In some embodiments, the sensing information includes the own state information of the vehicle, such as vehicle speed, vehicle acceleration, vehicle hardware working state and other vehicle state information. In some embodiments, the sensing information may also include the environment information outside the vehicle, such as the vehicle feasible area, obstacles, pedestrians around the vehicle and other vehicles.

In some embodiments, the positioning unit 2022 is configured to obtain the location information of the vehicle based on the sensing information and obtain the positioning information. In some embodiments, the positioning unit 2022 may obtain the location information of the vehicle based on GPS, IMU, identification location module, etc. In some embodiments, the positioning information can be obtained by visual sensors, laser radar, etc., such as by V-SLAM, LIDAR-SLAM, etc.

The planning and control module 203 may determine vehicle planning control information based on the sensing information and the positioning information, wherein the vehicle planning control information may be generated based on driving comfort, timeliness and applicability. In some embodiments, the planning and control module can further combine at least one of V2X data, high definition map and other data for making path planning and decision. In some embodiments, the planning and control module may also receive the vehicle state assessment results and/or risk assessment results to determine the vehicle planning control information, and determine the vehicle planning control information based on the sensing information, the positioning information, the vehicle state assessment results and the risk assessment results.

In some embodiments, the vehicle planning control information may include the vehicle speed, front wheel deflection angle, acceleration, deceleration, steering wheel Angle, brake, throttle and other control information.

In some embodiments, the planning and control module 203 may include planning unit 2031 and planning motion control unit 2032, wherein the planning unit 2031 may be configured to generate planning information. In some embodiments, the planning unit may generate planning information based on the sensing information and the positioning information generated by the sensing unit and positioning unit. The planning unit can also combine at least one of V2X data, high definition map and other data to generate the planning information. In some embodiments, the planning information may include, but not limited to, desired path, behavior (e.g. including but not limited to following, overtaking, stopping, detouring, etc.), vehicle heading, vehicle speed, desired acceleration of vehicle, desired steering wheel angle, etc. In some embodiments, the planning unit may receive vehicle status assessment results and/or risk assessment results to determine the planning information. The planning unit may determine the planning information based on passenger comfort, wherein the passenger comfort includes driving comfort, driving timeliness, driving applicability and so on. The planning unit may transmit the planning information and decision to the planning motion control unit.

In some embodiments, planning unit 2031 may transmit the planning information and performance of the planning unit 2031 to the planning motion control unit 2032.

The planning motion control unit 2032 is configured to determine the vehicle planning control information based on the planning information, wherein the vehicle planning control information indicates execution information of the underlying control system of the vehicle. In some embodiments, the planning motion control unit may transmit vehicle control information to enable the underlying vehicle execution system controlling the vehicle to drive in the desired path, such as performing lateral and longitudinal control for the vehicle by controlling the steering wheel, brake, and accelerator. For example, the planned maximum acceleration may not exceed 5 m/S$^2$, and the steering maximum angle may not exceed 15°.

The safety control module 204 is configured to generate vehicle safety control information based on the sensing information and the positioning information, wherein the vehicle safety control information is generated based on driving safety, stability and collision consequences. In some embodiments, the safety control module may determine the vehicle safety control information based on vehicle state assessment results and risk assessment information, it means that the safety control module may determining the vehicle safety control information based on the sensing information, the positioning information, the vehicle state assessment results and the risk assessment information to provide high safety control decisions for intelligent network vehicles.

In some embodiments, the safety control module 204 may include safety planning unit 2041 and safety behavior control unit 2042. The planning unit 2041 is configured to generate safety planning information. In some embodiments, the safety planning unit 2041 may generate the safety planning information based on the sensing information and the positioning information generated by the sensing module and the positioning module. The safety planning unit 2041 can also combine at least one of V2X data, high definition map and other data to generate the safety planning information. In some embodiments, the safety planning information may include, but not limited to, behavior (e.g. including, but not limited to, following, overtaking, stopping, detouring, etc.), vehicle heading, vehicle speed, expected acceleration of vehicle, expected steering wheel angle, etc. In some embodiments, the safety planning unit may receive the vehicle state assessment results and/or the risk assessment information for determining the safety planning information. The safety planning unit may plan the vehicle based on driving safety, stability and collision consequences. The safety planning unit transmits the planning information and decision to the planning motion control unit.

The safety behavior control unit 2042 is configured to determine the vehicle safety control information based on the safety planning information, wherein the safety control information may indicate the implementation information of the vehicle underlying control system of the vehicle. In some embodiments, the safety behavior control unit may transmit the vehicle control information to the underlying vehicle control system for controlling the vehicle driving in the expected path, such as lateral and longitudinal control of the vehicle by controlling the steering wheel, brake, and throttle. In some embodiments, when the vehicle safety control information is generated, the vehicle safety planning information is determined based on safety factors, comprising, but not limited to, vehicle slip rate, yaw Angle, roll Angle and other safety factors. For example, the vehicle slip rate should not exceed 20%, and the vehicle yaw Angle and roll Angle should be kept within the safe range.

The function assessment module 205 is configured to generate the vehicle state assessment results. The function assessment module 205 may monitor working status of the sensor group 10, the sensing and positioning module 202, the planning and control module 203, the safety control module 204 and the execution module 208 in real time to determine the first monitoring results, and evaluates the functions of the above functional modules based on the first monitoring results to obtain the vehicle state assessment results, wherein the first monitoring results may include, but not limited to, fault monitoring results and functional failure monitoring results of software and hardware.

In some embodiments, the function assessment module 205 may monitor the status of the sensor group 10, the sensing and positioning module 202, the planning and control module 203, the safety control module 204 and the execution module 208 to get the first monitoring results, and then evaluate the damage severity of the modules based on the first monitoring results in a graded manner to obtain the vehicle state assessment results. In some embodiments, the first monitoring results may include, but not limited to, fault monitoring results and functional failure monitoring results of software and hardware.

In some embodiments, the function assessment module 205 may include function monitoring unit 2051 and function assessment unit 2052, wherein the function monitoring unit is configured to generate the first monitoring results. The first monitoring results may include fault monitoring results and functional failure monitoring results of software and hardware of the function modules, wherein the function modules may include the sensor group 10, the sensing and positioning module 202, the planning and control module 203, the safety control module 204, the function assessment module 205 and the execution module 208.

In some embodiments, the function monitoring unit may include fault monitoring sub-units and function monitoring sub-units, wherein the fault monitoring sub-units may monitor the status of the sensor group 10, the sensing and positioning module 202, the planning and control module 203, the safety control module 204, the function assessment module 205 and the execution module 208 to obtain the corresponding fault monitoring information. The function monitoring sub-units may be configured to monitor the status of the sensor group 10, the sensing and positioning module 202, the planning and control module 203, the safety control module 204, the function assessment module 205 and the execution module 208 to determine whether the modules described above are failed to work.

The function assessment unit 2052 is configured to determine the vehicle status assessment results. In some embodiments, the function assessment unit 2052 is configured to evaluate the safety of the vehicle based on the first monitoring result and determine the vehicle state assessment results. In some embodiments, the function assessment unit 2052 may transmit the vehicle state assessment results to the planning and control module 203 and safety control module 204. In some embodiments, when the vehicle state assessment results determined by function assessment unit 2052 are changed, the planning and control module 203 may update the vehicle planning control information based on the vehicle state assessment results. In some embodiments, the safety control module 204 may update the vehicle safety control information based on the vehicle state assessment results.

The risk assessment module 206 is configured to determine the risk assessment results. In some embodiments, the risk assessment module 206 is configured to obtain the risk assessment results based on the sensing information, the positioning information, the status and the planning information of the planning and control module, and the status and the safety planning information of the safety control module.

In some embodiments, the risk assessment module 206 may include a risk monitoring unit and a risk assessment unit. In some embodiments, the risk monitoring unit may determine the risk monitoring information based on the sensing information and the positioning information. The risk monitoring information may include, but not limited to, collision monitoring information, feasible region monitoring information, etc. In some embodiments, the risk assessment module may use sensors independent from the sensing and positioning module to ensure the independence of the risk assessment.

After the risk monitoring unit determines the risk monitoring information, it sends the risk monitoring information to the risk assessment unit.

The risk monitoring unit includes feasible region monitoring sub-unit and collision monitoring sub-unit. The feasible region monitoring sub-unit is configured to monitor the environment in the feasible region to obtain feasible region monitoring information and status information of the feasible region monitoring sub-units. In some embodiments, the collision monitoring subunit is configured to monitor the environment around the vehicle to obtain the collision monitoring information and the working state of the collision monitoring sub-units. In some embodiments, the collision monitoring information can be obtained based on the sensing information, the positioning information, and monitoring information in real-time monitoring the surrounding environment. In some embodiments, the collision monitoring information may be obtained directly from independent sensors. In some embodiments, the feasible region monitoring information may include, but not limited to, weather, speed, pedestrian/animal, etc.

The risk assessment unit 2062 is configured to determine the risk assessment results based on the risk monitoring information, the vehicle planning control information and the vehicle safety control information. In some embodiments, the risk assessment unit may further determine the risk assessment results based on the working status of the risk monitoring unit, the planning unit and the safety planning unit.

In some embodiments, the risk assessment unit 2402 can also evaluate the overall risk of the vehicle based on the vehicle speed, driving style, weather, road complexity and other information, and then determine the risk assessment results. In some embodiments, the risk assessment unit 2062 may send the risk assessment results to the planning unit 2031, the safety planning unit 2041, and the logic arbitration module 207, wherein, the planning and control module 203 may modify the vehicle planning control information based on the risk assessment results, and the safety control module 204 may modify the vehicle safety control information based on the risk assessment results. For example, when the risk assessment result is level 2, it needs to limit the minimum speed to satisfy the timeliness. The planning and control module 203 and the safety control module 204 can modify the vehicle planning control information and the safety control information correspondingly to limit the minimum speed at 90 km/h, and modify the vehicle planning control information and safety control information correspondingly based on the minimum speed.

In some embodiments, the planning and control module 203 and the safety control module 204 can also limit the maximum steering angle, such as limit the maximum steering angle to 15°, and modifying the vehicle planning control information and vehicle safety control information based on the maximum steering angle.

The logic arbitration module 207 is configured to determine vehicle execution information. The logic arbitration module may determine the vehicle execution information based on the vehicle planning control information and safety control information. In some embodiments, the logic arbitration module may further determine the vehicle execution information based on the working state of the function assessment module and the working state of the risk assessment module.

For example, logic arbitration module 207 can determine the planning control information as the vehicle execution information based on the risk level of risk assessment results being low. When the risk level is high, the safety control information can be determined as the vehicle execution information. When the risk level may threat the safety of the vehicle or passengers, the vehicle may be determined to slow down or stop as soon as possible. If the function assessment result may include that the function modules exist fault or failure, the vehicle may be controlled to slow down or stop.

In some embodiments, the logic arbitration module 207 can select the vehicle planning control information when the risk level of intelligent network vehicles is low, for example, the risk level is lower than 2. In some embodiments, when the risk level of intelligent network vehicles is high, such as level 4, the logic arbitration module 207 can select the vehicle safety control information. In some embodiments, when the intelligent network vehicle has higher risk level, such as risk level above 5, the logic arbitration module 207 can be controlled to temporarily maintain the speed and seek time opportunity to temporarily stop, or to reduce the speed and seek time opportunity to stop temporarily. In some embodiments, when the intelligent network vehicle has higher risk, such as risk level above 5, the logic arbitration module 207 can choose to decelerate at a maximum deceleration speed, such as 12.5 m/S$^2$ deceleration speed.

The execution module 208 is configured to control the vehicle driving based on the vehicle execution information. In some embodiments, the execution module 208 may receive the vehicle execution information sent by the logic arbitration module 207 and control the vehicle driving based on the vehicle execution information. In some embodiments, the execution module 208 may include, but not limited to, the chassis, steering system, power system, braking system and other vehicle hardware. In some embodiments, the execution module may parse the vehicle execution information and send matching execution signals to each hardware of the vehicle respectively. The execution module can also monitor its own working status and send the working status to the function assessment module.

It should be noted that each module involved in the present implementation is a logical module, and in practical applications, a logical unit can be a physical unit, or part of a physical unit, or can be implemented as a combination of multiple physical units. In addition, in order to highlight the innovative part of the present disclosure, the present implementation does not introduce the units that are less closely related to solving the technical problems presented in the present disclosure, but this does not indicate that other units do not exist in the present implementation.

Figure 3:
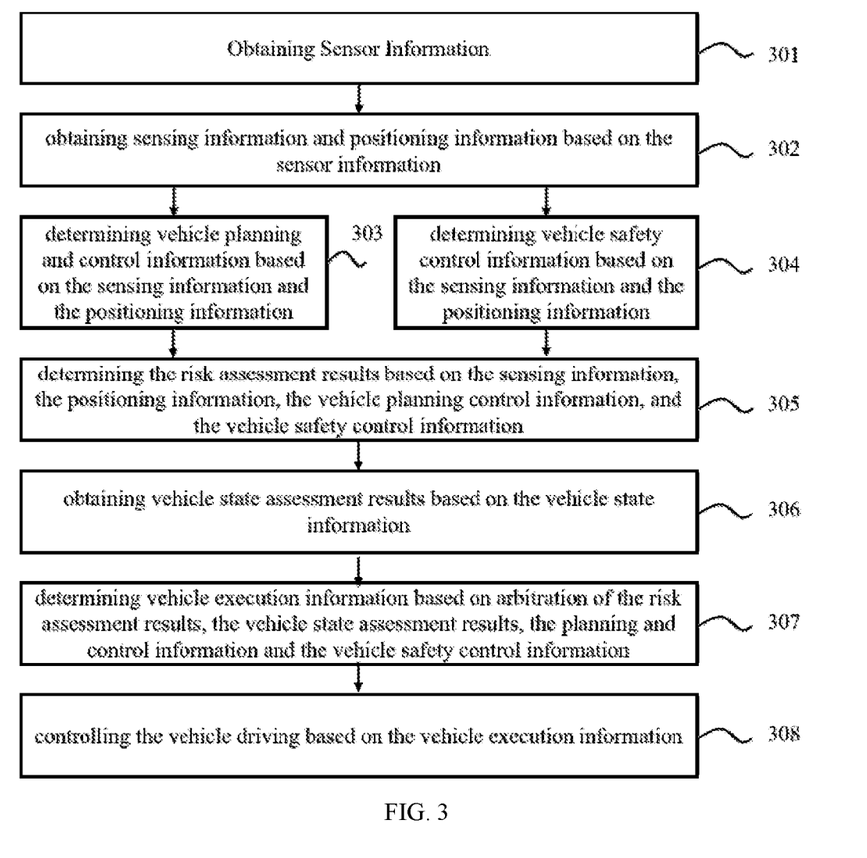
FIG. 3 illustrates a flow chart of a control method for intelligent network vehicles according to some embodiments of the present disclosure.

FIG. 3 illustrates a flow chart of a control method for intelligent network vehicles according to some embodiments of the present disclosure. The execution subject of the control method is the control system provided by embodiments of the present disclosure, and the specific structure of the control system is not described here. In some embodiments, the control method provided in the embodiments can be applied to intelligent network autonomous driving vehicles.

As shown in FIG. 3, the control method for intelligent network vehicles includes following steps.

301. obtaining sensor information.

The sensor information may be obtained from the sensor group and transmitted to the intelligent control system through the sensor receiving module. The sensor information may include environment information and vehicle status information, wherein the environment information may include obstacles, pedestrians, surrounding vehicles, drivable areas, road markings, etc. The vehicle state information may include speed, front wheel deflection angle, acceleration, deceleration, steering wheel angle, brake, accelerator and other states.

In some embodiments, the sensor group may also monitor its own state information and transmits its state information to the intelligent control system through the sensor receiving module, wherein its own state information may include the working status of each sensor in the sensor group.

302. obtaining sensing information and positioning information based on the sensor information.

In some embodiments, the sensing information may include state information of the vehicle, such as vehicle speed, vehicle acceleration, the working status of hardware in the vehicle and other vehicle state information. In some embodiments, the sensing information may also include information about the environment outside the vehicle, such as the vehicle drivable area, obstacles, pedestrians around the vehicle and other vehicles.

The positioning information may be obtained based on GPS, IMU, identification location module. In some embodiments, the positioning information can be obtained by visual sensors, laser radar, etc., such as by V-SLAM, LIDAR-SLAM, etc.

303. determining vehicle planning and control information based on the sensing information and the positioning information.

The vehicle planning and control information may include the vehicle speed, front wheel deflection angle, acceleration, deceleration, steering wheel angle, brake, throttle and other control information.

In some embodiments, the vehicle planning and control information may be determined based the sensing information, the positioning information, vehicle state assessment results and risk assessment results.

Specifically, the control system may receive the sensing information, the positioning information, the vehicle state assessment results, and the risk assessment results; the control system may then determine the planning information based on the sensing information, the positioning information, the vehicle state assessment results, and the risk assessment results; and the control system may obtain the vehicle planning control information by analyzing the planning information.

304, determining vehicle safety control information based on the sensing information and the positioning information.

In some embodiments, the safety planning information may be generated based on the sensing information and the positioning information. The safety planning information may be generated based on the sensing information and the positioning information, and further combined with at least one of V2X data and high definition map.

In some embodiments, the vehicle safety control information is determined based on the sensing information, the positioning information, the vehicle state assessment results, and the risk assessment results.

Specifically, the control system may receive the sensing information, the positioning information, the vehicle state assessment results, and the risk assessment results; the control system may then determine the safety planning information based on the sensing information, the positioning information, the vehicle state assessment results, and the risk assessment results; the control system may obtain the vehicle safety control information by analyzing the safety planning information.

305. determining the risk assessment results based on the sensing information, the positioning information, the vehicle planning control information, and the vehicle safety control information.

In some embodiments, the control system may determine the risk assessment results based on the sensing information, the positioning information, the working status and the planning information of the planning and control module, the working status and the safety planning information of the safety control module. In some embodiments, the risk assessment module may monitor the driving environment of the intelligent network vehicle, and evaluate the risk of the intelligent network vehicle based on the sensing information, the positioning information, the status and planning information of the planning and control module, the working status and safety planning information of the safety control module. In some embodiments, the risk assessment results may include one to six levels, wherein different levels indicate different of risk degree.

In some embodiments, the risk assessment result may be determined by the following steps: receiving the sensing information and the positioning information, and determining the risk monitoring information based on the sensing information and the positioning information; determining the risk assessment results based on the risk monitoring information, vehicle planning and control information, vehicle safety control information. Specifically, the control system may receive the status and planning information of the planning and control module, and the status and safety planning information of the safety control module; the control system may monitor the environment in feasible region to obtain feasible region monitoring information and status information; the control system may monitor the environment around the vehicle to obtain collision monitoring information and status information; the control system may obtain the risk assessment result based on the sensor information, the positioning information, the status and the planning information of the planning and control module, the status and the safety planning information of the safety control module, the feasible region monitoring information and the status information, collision monitoring information and the status information.

In some embodiments, feasible region monitoring information may be determined based on at least one of the weather conditions, vehicle speed, pedestrian/animal and other factors. In some embodiments, the risk assessment results may be determined based on at least one of the current vehicle speed, driving style, planning information, safety planning information, risk monitoring information, feasible region monitoring information and other factors.

In some embodiments, the risk assessment results may be transmitted to the safety control module, the planning and control module, and the logic arbitration module.

306. obtaining vehicle state assessment results based on the vehicle state information.

In some embodiments, the control system may receive the status information of the sensor group, the sensing and positioning module, the planning and control module, the safety control module and the execution module; the control system may obtain the working status of the sensor group, the sensing and positioning module, the planning and control module, the safety control module and the execution module based on the status information; the control system may determine the vehicle state assessment results based on the working status of the sensor group, the sensing and positioning module, the planning and control module, the safety control module, function assessment module and execution module.

307. determining vehicle execution information based on arbitration of the risk assessment results, the vehicle state assessment results, the planning and control information and the vehicle safety control information.

In some embodiments, the vehicle execution information may be obtained by arbitrating the vehicle planning control information and the vehicle safety control information based on the working status of the function assessment module, the working status of the risk assessment module, the vehicle state assessment result and the risk assessment result.

In some embodiments, the vehicle planning and control information and the vehicle safety control information may be arbitrated based on the risk level and functional damage level of the risk assessment results, the working status of risk assessment module and function assessment module. The logic arbitration module may determine the vehicle planning and control information or the vehicle safety control information as the vehicle execution information.

308, controlling the vehicle driving based on the vehicle execution information. In some embodiments, the execution module may execute the vehicle execution information of the logical arbitration module.

The above division of the steps of various methods is only for the purpose of describing clearly, and the implementation can be combined into one step or split for some steps and decomposed into multiple steps, as long as they include the same logical relationship, they are all within the scope of protection of the present disclosure; adding insignificant modifications to the algorithm or process or introducing insignificant designs, but not changing the core design of its algorithm and process are all within the scope of protection of the present disclosure.

In the control method for intelligent network vehicles provided in the embodiment, the sensing and positioning module obtains the sensing information and the positioning information based on the sensor information; The planning and control module obtains the vehicle planning control information based on the basing information, the positioning information, the risk assessment results and the vehicle state assessment results. The safety control module obtains the vehicle safety control information based on the sensing information, the positioning information, the risk assessment results and the vehicle state assessment results. The function assessment module obtains the vehicle state assessment results based on the status of each unit. The risk assessment module obtains the risk assessment results based on the feasible region monitoring information and collision monitoring information combined with the status of the planning and control module, the planning information, the status of the safety control module and the safety planning information. The logic arbitration module arbitrates the vehicle planning and control information and the vehicle safety control information based on the risk assessment results and vehicle state assessment results, and sends the arbitration results to the execution module for execution. The decision execution information under different driving conditions is obtained from both the performance and safety perspectives by the planning and control module and the safety control module simultaneously, which not only considers the failure and fault of each unit and module, but also considers the risk of driving decision, and reduces the response time. The logic arbitration module can arbitrate based on the risk assessment results and performance assessment results, which makes the vehicle execution information more accurate and reduces the driving risk of intelligent network vehicles.

Figure 4:
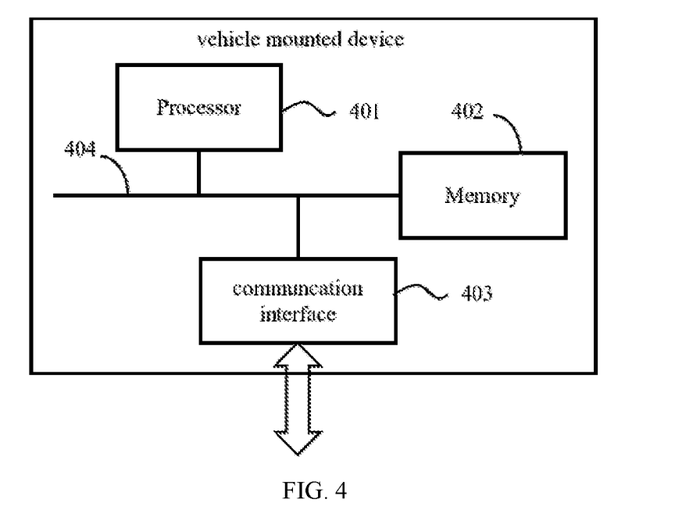
FIG. 4 is the schematic diagram of a vehicle-mounted device according to some embodiments of the present disclosure.

FIG. 4 is the schematic diagram of a vehicle-mounted device according to some embodiments of the present disclosure. The autonomous vehicle may include the vehicle-mounted device. The vehicle-mounted device may include at least one processor 401, at least one memory 402, and at least one communication interface 403. The processor 401 and the memory 402 are coupled via the bus system 404. The communication interface 403 is configured to transfer information with external devices. Understandably, the bus system 404 is used for connection communication between components including processor 401 and memory 402. Bus system 404 may include power bus, control bus and status signal bus in addition to data bus. For illustration purposes, the various bus are labeled as bus system 404 in FIG. 4.

The memory 402 in the present embodiment may be volatile memory or non-volatile memory, or may include both volatile and non-volatile memory.

In some embodiments, the memory 402 may store the following elements, executable modules or data structures, or subsets of them, or extended set of them, operating systems and applications.

Among them, the operating system, including various system procedures, such as the framework layer, core library layer, driver layer, etc., is configured to implement various underlying operations as well as handling hardware-based tasks. Applications, including various applications such as Media Player and Browser, are configured to implement various application services. Program for implementing the control method provided by the present disclosed embodiment for an intelligent network vehicle may be included in the application.

In an embodiment, the processor 401 may call the program or instruction stored in the memory 402, specifically, the program or instruction stored in the application. The processor 401 is configured to execute the steps of each embodiment of the control system and control method of intelligent network vehicle provided in the disclosed embodiment.

The control system and control method of intelligent network vehicle provided in the embodiment can be applied in or implemented by processor 401. The processor 401 can be an integrated circuit chip with signal processing capability. In the implementation process, the steps of the above method can be completed by the integrated logic circuit of the hardware or software instructions in processor 401. The processor 401 described above may be a general purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The general purpose processor may be a microprocessor or the processor can also be any conventional processor, etc.

The steps of the control method for the intelligent network vehicle provided in the present embodiment may be directly embodied as executed by the hardware decoding processor or executed with a combination of hardware and software units in the decoding processor. The software unit may be located in a random memory, flash memory, read-only memory, programmable read-only memory or electrically erasable programmable memory, registers, or other storage media well established in the art. The storage medium may be located in memory 402, and the processor 401 may read the information in memory 402, and completes the steps of the method in combination with its hardware.

The present disclosure also presents a non-transitory computer readable storage medium, wherein the non-transitory computer readable storage medium may store program or instructions, and the program or instruction may enable the computer to execute the steps such as the control method for the intelligent network vehicle of each embodiment, which will not be repeated herein to avoid repetitive description.

It should be noted that, in the present disclosure, the terms "include", "have" or any other variants thereof are meant to cover non-exclusive inclusion, so that a process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

It could be understood that the above embodiments are merely exemplary embodiments adopted for describing the principle of the present disclosure, but the present disclosure is not limited thereto. Various variations and improvements may be made for those with ordinary skill in the art without departing from the spirit and essence of the present disclosure, and these variations and improvements shall also fall within the protection scope of the present disclosure.

We claim:

1. A control system for intelligent network vehicles, comprises a sensor group, a sensing and positioning module, a planning and control module, a safety control module, a function assessment module, a risk assessment module, a logical arbitration module, and an execution module, wherein:
   the sensor group is configured to obtain sensor information;
   the sensing and positioning module is configured to obtain sensing information and positioning information based on the sensor information;
   the planning and control module is configured to determine vehicle planning control information based on the sensing information and the positioning information;
   the safety control module is configured to determine vehicle safety control information based on the sensing information and the positioning information;
   the function assessment module is configured to determine a vehicle state assessment result;
   the risk assessment module is configured to determine a risk assessment result including a level of risk, wherein the planning and control module is configured to perform altering of the vehicle planning control information such that a manner of satisfying a timeliness requirement is altered based on the level of risk and wherein the altering of the vehicle planning control information comprises limiting a minimum speed of the vehicle to satisfy the timeliness requirement based on the level of risk;
   the logic arbitration module is configured to arbitrate the vehicle planning control information and the vehicle safety control information based on working status of the function assessment module and working status of the risk assessment module to determine vehicle execution information that is based at least in part on the altered vehicle planning control information; and
   the execution module is configured to control driving of the vehicle based on the vehicle execution information.

2. The control system according to claim 1, wherein the sensing and positioning module comprises:
   a sensing unit configured to obtain the sensing information by sensing status of the vehicle and an environment around the vehicle based on the sensor information;
   a positioning unit configured to obtain the positioning information by obtaining location information based on the sensor information.

3. The control system according to claim 1, wherein:
   the planning and control module is configured to plan the vehicle based on driving comfort, and capability of the vehicle to execute the plan; and
   the safety control module is configured to plan the vehicle based on driving safety, stability, and collision consequences.

4. The control system according to claim 1, wherein, the planning and control module comprises a planning unit and a planning motion control unit, wherein,
   the planning unit is configured to determine planning information based on the sensing information, the positioning information, the vehicle state assessment result, and the risk assessment result; and
   the planning motion control unit is configured to determine the vehicle planning control information based on the planning information.

5. The control system according to claim 1, wherein the safety control module comprises a safety planning unit and a safety behavior control unit, wherein,
   the safety planning unit is configured to determine safety planning information based on the sensing information, the positioning information, the vehicle state assessment result, and the risk assessment result; and
   the safety behavior control unit is configured to determining the vehicle safety control information based on the safety planning information.

6. The control system according to claim 1, wherein the function assessment module comprises a function monitoring unit and a function assessment unit, wherein:
   the function monitoring unit is configured to monitor working status of the sensor group, the sensing and positioning module, the planning and control module, the safety control module, the function assessment module, and the execution module in real time; and
   the function assessment unit is configured to determine the vehicle state assessment result based on the work status of the sensor group, the sensing and positioning module, the planning and control module, the safety control module, the function assessment module, and the execution module.

7. The control system according to claim 6, wherein the function monitoring unit comprises:
   a fault monitoring sub-unit configured to monitor whether the sensor group, the sensing and positioning module, the planning and control module, the safety control module, the function assessment module, and the execution module occur fault; and
   a function monitoring sub-unit configured to monitor whether the sensor group, the sensing and positioning module, the planning and control module, the safety control module, the function assessment module, and the execution module are failed to work.

8. The control system according to claim 1, wherein, the risk assessment module comprises a risk monitoring unit and a risk assessment unit, wherein
the risk monitoring unit is configured to determine risk monitoring information based on the sensing information and the positioning information; and
the risk assessment unit is configured to determine the risk assessment result based on the risk monitoring information, the vehicle planning control information and the vehicle safety control information.

9. The control system according to claim 8, wherein the risk monitoring unit comprises:
a feasible region monitoring sub-unit configured to monitor an environment in a feasible region to obtain feasible region monitoring information and status information of the feasible region monitoring sub-unit; and
a collision monitoring sub-unit configured to monitor an environment around the vehicle to obtain collision monitoring information and working state of the collision monitoring sub-unit.

10. A control method for an intelligent network vehicle, wherein the control method comprises:
obtaining sensor information;
determining the sensing information and positioning information based on the sensor information;
determining vehicle planning control information based on the sensing information, the positioning information, a vehicle state assessment result and a risk assessment result;
determining vehicle safety control information based on the sensing information, the positioning information, the vehicle state assessment result, and the risk assessment result;
determining the vehicle state assessment result based on vehicle state information;
determining the risk assessment result, which includes a level of risk, based on the sensing information, the positioning information, the vehicle planning control information, and the vehicle safety control information;
altering the vehicle planning control information such that a manner of satisfying a timeliness requirement is altered based on the level of risk, wherein the altering the vehicle planning control information comprises limiting a minimum speed of the vehicle to satisfy the timeliness requirement based on the level of risk;
determining vehicle execution information by arbitrating based on the risk assessment result, the vehicle state assessment result, the vehicle planning control information, and the vehicle safety control information; and
controlling driving of the vehicle based on the vehicle execution information, said vehicle execution information being based at least in part on the altered vehicle planning control information.

11. The control method according to claim 10, wherein the determining of the vehicle planning control information based on the sensing information, the positioning information, the vehicle state assessment result, and the risk assessment result comprises:
receiving the sensing information, the positioning information, the vehicle state assessment result, and the risk assessment result;
determining planning information based on the sensing information, the positioning information, the vehicle state assessment result, and the risk assessment result; and
obtaining the vehicle planning control information by parsing the planning information.

12. The control method according to claim 10, wherein the determining of the vehicle safety control information based on the sensing information, the positioning information, the vehicle state assessment result, and the risk assessment result comprises:
receiving the sensing information, the positioning information, the vehicle state assessment result, and the risk assessment result;
determining safety planning information based on the sensing information, the positioning information, the vehicle state assessment result, and the risk assessment result; and
obtaining the vehicle safety control information by parsing the safety planning information.

13. The control method according to claim 10, wherein the determining of the vehicle state assessment result based on the vehicle state information comprises:
receiving state information of a sensor group configured to perform the obtaining the sensor information, a sensing and positioning module configured to perform the determining the sensing information and the positioning information based on the sensor information, a planning and control module configured to perform the determining the vehicle planning control information based on the positioning information, the vehicle state assessment result and the risk assessment result, a safety control module configured to perform the determining the vehicle safety control information based on the sensing information, the positioning information, the vehicle state assessment result, and the risk assessment result, and an execution module configured to perform the controlling the driving of the vehicle based on the vehicle execution information;
obtaining working status based on the state information of the sensor group, the sensing and positioning module, the planning and control module, the safety control module, and the execution module; and
determining the vehicle state assessment result based on the working status of the sensor group, the sensing and positioning module, the planning and control module, the safety control module, and the execution module.

14. The control method according to claim 10, wherein the determining of the risk assessment result based on the sensing information, the positioning information, the vehicle planning control information, and the vehicle safety control information comprises:
receiving the sensing information and the positioning information, and determining risk monitoring information based on the sensing information and the positioning information; and
determining the risk assessment result based on the risk monitoring information, the vehicle planning control information, and the vehicle safety control information.

15. A vehicle-mounted device, wherein the vehicle-mounted device comprises a processor, a memory, and a communication interface, wherein the communication interface is configured to connect the processor and the memory; the processor is configured to perform the control method according to claim 10 by calling a program or instruction stored in the memory.

16. The control method according to claim 10, wherein the obtaining the sensing information comprises sensing status of the vehicle and an environment around the vehicle based on the sensor information, and wherein the determining the sensing information and the positioning information comprises obtaining the positioning information by obtaining location information based on the sensor information.

17. The control method according to claim 10, wherein the control method further comprises:
    forming a plan of the vehicle based on driving comfort, capability of the vehicle to execute the plan, driving safety, stability, and collision consequences.

18. The control method according to claim 10, further comprising:
    determining planning information based on the sensing information, the positioning information, the vehicle state assessment result, and the risk assessment result, wherein the determining the vehicle planning control information is further based on the planning information.

19. The control method according to claim 10, further comprising:
    determining safety planning information based on the sensing information, the positioning information, the vehicle state assessment result, and the risk assessment result, wherein the;
    determining the vehicle safety control information is further based on the safety planning information.

20. A non-transitory computer readable storage medium, wherein the non- transitory computer readable storage medium stores programs or instructions, the programs or instructions are configured for causing a computer to perform a the-control method comprising:
    obtaining sensor information;
    determining the sensing information and positioning information based on the sensor information;
    determining vehicle planning control information based on the sensing information, the positioning information, a vehicle state assessment result and a risk assessment result;
    determining vehicle safety control information based on the sensing information, the positioning information, the vehicle state assessment result, and the risk assessment result;
    determining the vehicle state assessment result based on vehicle state information;
    determining the risk assessment result, which includes a level of risk, based on the sensing information, the positioning information, the vehicle planning control information, and the vehicle safety control information;
    altering the vehicle planning control information such that a manner of satisfying a timeliness requirement is altered based on the level of risk, wherein the altering the vehicle planning control information comprises limiting a minimum speed of the vehicle to satisfy the timeliness requirement based on the level of risk;
    determining vehicle execution information by arbitrating based on the risk assessment result, the vehicle state assessment result, the vehicle planning control information, and the vehicle safety control information; and
    controlling driving of the vehicle based on the vehicle execution information, said vehicle execution information being based at least in part on the altered vehicle planning control information.

* * * * *